United States Patent
Nagai

(10) Patent No.: US 11,294,400 B2
(45) Date of Patent: Apr. 5, 2022

(54) FLOW RATE CONTROL APPARATUS, FLOW RATE CONTROL METHOD, AND PROGRAM RECORDING MEDIUM HAVING RECORDED THEREIN PROGRAM FOR FLOW RATE CONTROL APPARATUS

(71) Applicant: HORIBA STEC, Co., Ltd., Kyoto (JP)

(72) Inventor: Kentaro Nagai, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 1 day.

(21) Appl. No.: 16/446,934

(22) Filed: Jun. 20, 2019

(65) Prior Publication Data

US 2020/0026311 A1 Jan. 23, 2020

(30) Foreign Application Priority Data

Jul. 17, 2018 (JP) .............................. JP2018-134354

(51) Int. Cl.
*G05D 7/06* (2006.01)
*G01F 15/00* (2006.01)
*G01F 1/36* (2006.01)

(52) U.S. Cl.
CPC ........... *G05D 7/0623* (2013.01); *G01F 1/363* (2013.01); *G01F 15/005* (2013.01)

(58) Field of Classification Search
CPC ..... G01F 1/363; G01F 15/005; G05D 7/0623; G05D 7/0647
See application file for complete search history.

(56) References Cited

U.S. PATENT DOCUMENTS

| | | | | |
|---|---|---|---|---|
| 5,816,285 A | * | 10/1998 | Ohmi | G05D 7/0635 137/487.5 |
| 6,125,869 A | * | 10/2000 | Horiuchi | F16K 37/0091 137/1 |
| 10,031,005 B2 | * | 7/2018 | Ding | G05D 7/0647 |
| 2007/0233412 A1 | * | 10/2007 | Gotoh | G01F 25/0007 702/100 |
| 2017/0234455 A1 | * | 8/2017 | Hirata | G01F 15/005 702/184 |
| 2017/0293309 A1 | * | 10/2017 | Kishine | G05D 7/0635 |
| 2018/0246533 A1 | * | 8/2018 | Somani | G01F 1/36 |

FOREIGN PATENT DOCUMENTS

| | | | |
|---|---|---|---|
| JP | 2004280688 A | 10/2004 | |
| WO | WO-2017110066 A1 * | 6/2017 | ............... G01F 1/42 |

\* cited by examiner

*Primary Examiner* — Angelisa L. Hicks
(74) *Attorney, Agent, or Firm* — Alleman Hall Creasman & Tuttle LLP

(57) ABSTRACT

In order to provide a flow rate control apparatus capable of reducing pressure loss due to a downstream valve while enhancing responsiveness in flow rate control, a controller is designed to control the downstream valve on the basis of a flow rate deviation when a valve opening of the downstream valve is smaller than a predetermined valve opening. The controller is designed to control an upstream valve on the basis of the flow rate deviation when the valve opening of the downstream valve is the predetermined valve opening or more.

12 Claims, 5 Drawing Sheets

FLOW RATE CONTROL APPARATUS, FLOW RATE CONTROL METHOD, AND PROGRAM RECORDING MEDIUM HAVING RECORDED THEREIN PROGRAM FOR FLOW RATE CONTROL APPARATUS

BACKGROUND OF THE INVENTION

Field of the Invention

The present invention relates to a flow rate control apparatus including a plurality of valves.

Background Art

There has been a flow rate control apparatus including a flow rate sensor, an upstream valve disposed upstream of the flow rate sensor, and a downstream valve disposed downstream of the flow rate sensor as disclosed in Patent Document 1. With the flow rate control apparatus, a valve opening of the upstream valve is controlled on the basis of feedback of a measured pressure measured by a pressure sensor, and a valve opening of the downstream valve is controlled on the basis of feedback of a measured flow rate measured by the flow rate sensor.

However, because the above flow rate control apparatus includes not only the upstream valve but also the downstream valve, there is a problem that pressure loss becomes greater than a flow rate control apparatus including only one valve.

PRIOR ART DOCUMENT

Patent Document

Patent Document 1: Japanese Unexamined Patent Publication No. 2004-280688

SUMMARY OF THE INVENTION

Problems to be Solved by the Invention

The present invention has been made to solve the above problem and has for its main object to provide a flow rate control apparatus capable of reducing the pressure loss due to the downstream valve while enhancing responsiveness in flow rate control.

Means of Solving the Problems

In one embodiment of the present invention, a flow rate control apparatus includes a fluid resistor, an upstream valve, a downstream valve, a downstream pressure sensor, a resistor flow rate calculation section, and a controller. The fluid resistor is disposed in a flow channel. The upstream valve is disposed upstream of the fluid resistor. The downstream valve is disposed downstream of the fluid resistor. The downstream pressure sensor is disposed between the fluid resistor and the downstream valve. The resistor flow rate calculation section is designed to calculate a resistor flow rate being a flow rate of a fluid flowing through the fluid resistor. The controller is designed to control the upstream valve or the downstream valve on the basis of a deviation between a set flow rate and the resistor flow rate, or a flow rate deviation being a deviation between the set flow rate and a flow rate calculated from the resistor flow rate. The controller is designed to control the downstream valve on the basis of the flow rate deviation when a valve opening of the downstream valve is smaller than a predetermined valve opening. The controller is designed to control the upstream valve on a basis of the flow rate deviation when a valve opening of the downstream valve is the predetermined valve opening or more.

With the above embodiment, during a transient response that, for example, the downstream valve is fully closed and flow rate control is started from a state in which no fluid flows in the flow channel, time delay can be reduced to implement the flow rate control having good responsiveness by controlling the downstream valve located most downstream so as to bring a fluid supply object near a position of a flow rate point.

In cases where a flow rate of the fluid flowing through the flow channel approximately coincides with the set flow rate and the downstream valve is opened to a predetermined valve opening, it is possible to change over to the flow rate control by the upstream valve.

Therefore, for example, when a steady state is established, it is possible to design so that the flow rate control of the downstream valve is not carried out and a valve opening thereof remains unchanged. This makes it possible for the downstream valve to be held opened in the steady state, thereby reducing more pressure loss than conventional ones.

Further, because the flow rate control by the upstream valve is continued, it is possible to maintain at a constant flow rate even if variations in fluid supply pressure and other disturbance occur. Furthermore, because the upstream valve is disposed upstream of the fluid resistor, a pressure suitable for implementing flow rate control at high speed is easily chargeable. Additionally, even if the downstream valve reaches a valve opening for full opening and there is no allowance for further changing the valve opening in the early phase flow rate feedback control by the downstream valve, it becomes possible to further change the valve opening by changeover to the flow rate feedback control by the upstream valve. This leads to another continuation of the flow rate control.

In order to minimize pressure loss in the downstream valve after the flow rate feedback control by the upstream valve is started, the controller needs to be configured to carry out control so that a valve opening of the downstream valve is held constant at a predetermined maintaining valve opening when the valve opening of the downstream valve is the predetermined valve opening or more, and needs to be configured to control the upstream valve on the basis of the flow rate deviation. Alternatively, the maintaining valve opening may be a valve opening identical with or different from the predetermined valve opening that becomes a reference for changeover of the flow rate control.

In order that a fluid is charged into a volume between the fluid resistor and the downstream valve at a sufficient pressure so as to facilitate implementation of high-speed response during the flow rate control by the downstream valve, and that a somewhat opened state of the upstream valve is implemented at a point in time that the flow rate control by the downstream valve is changed over to the flow rate control by the upstream valve so as to relax discontinuity of control due to the changeover, the control apparatus needs to further include an upstream pressure sensor disposed between the upstream valve and the fluid resistor. The controller needs to control the downstream valve on the basis of a deviation between the set flow rate and the valve flow rate when a valve opening of the downstream valve is smaller than the predetermined valve opening, and needs to control the upstream valve on the basis of a pressure deviation being a deviation between a set pressure and an upstream pressure measured by the upstream pressure sensor.

In order to decrease a pressure of a fluid between the upstream valve and the downstream valve, the set pressure may include a rising portion where the set pressure is held constant at a predetermined target pressure value and a pressure decrease portion where the target pressure value continuously decreases from the rising portion. The above set pressure contributes to causing a large amount of the fluid to flow into space between the upstream valve and the downstream valve immediately after the flow rate feedback control by the downstream valve is started in the rising portion. It is therefore possible to reduce time needed until the flow rate of the fluid flowing through the flow channel matches the set flow rate. Additionally, because the target pressure value continuously decreases over a predetermined period of time in the pressure decrease portion after the flow rate becomes stable, it is possible to decrease the pressure of the fluid while ensuring that a flow rate of the actually flowing fluid is approximately identical to the set flow rate. Hence, even a minute flow rate change can be controlled with good sensitivity at a point in time that the flow rate control by the upstream valve is started, thereby improving robustness in the steady state.

In order that the pressure loss due to the downstream valve can be reduced most after the changeover from the flow rate control by the downstream valve to the flow rate control by the upstream valve, the predetermined valve opening needs to be a valve opening for full opening.

As a specific configuration for achieving the changeover from the flow rate control by the downstream valve to the flow rate control by the upstream valve, the controller further includes a downstream valve control section, an upstream valve control section, and a setting command output section. The downstream valve control section controls a valve opening of the downstream valve. The upstream valve control section controls a valve opening of the upstream valve. The setting command output section outputs a first setting command to the upstream valve control section and the downstream valve control section when the valve opening of the downstream valve is smaller than the predetermined valve opening, and outputs a second setting command to the upstream valve control section and the downstream valve control section when the valve opening of the downstream valve is the predetermined valve opening or more.

In order that the downstream valve control section is capable of changing over a control mode according to a valve opening of the downstream valve, the downstream valve control section needs to include an early phase flow rate control section, a valve opening maintaining section, and a downstream control changeover section. The early phase flow rate control section outputs to the downstream valve a manipulated valuable calculated on the basis of a deviation between the set flow rate and the valve flow rate. The valve opening maintaining section outputs a manipulated variable held constant to the downstream valve. The downstream control changeover section causes the early phase flow rate control section to output the manipulated variable when the first setting command is being input. The downstream control changeover section causes the valve opening maintaining section to output the manipulated variable when the second setting command is being input.

In order that the upstream valve control section is capable of changing over a control mode according to a valve opening of the downstream valve, the upstream valve control section needs to include a pressure control section, a later phase flow rate control section, and an upstream control changeover section. The pressure control section outputs to the upstream valve a manipulated variable calculated on the basis of the pressure deviation. The later phase flow rate control section outputs to the upstream valve a manipulated variable calculated on the basis of the flow rate deviation. The upstream control changeover section causes the pressure control section to output the manipulated variable when the first setting command is being inputted. The upstream control changeover section causes the later phase flow rate control section to output the manipulated variable when the second setting command is being inputted.

In order to further improve responsiveness of the flow rate control by further reducing time delay by ensuring that a flow rate used for flow rate feedback indicates a flow rate of a fluid passing through the downstream valve and a measuring point matches a control point, the flow rate control apparatus needs to further include a downstream pressure sensor and a valve flow rate calculation section. The downstream pressure sensor is disposed between the fluid resistor and the downstream valve. The valve flow rate calculation section calculates a valve flow rate being a flow rate of a fluid passing through the downstream valve on a basis of the resistor flow rate and temporal variation of downstream pressure measured by the downstream pressure sensor. The flow rate deviation needs to be a deviation between the set flow rate and the valve flow rate.

In order to decrease the number of components necessary for flow rate measurement by configuring so that the resistor flow rate is also calculable while using the downstream pressure necessary for calculating the valve flow rate, the resistor flow rate calculation section needs to calculate the resistor flow rate on the basis of an upstream pressure measured by the upstream pressure sensor and the downstream pressure.

In one embodiment of the present invention, a flow rate control method is one which uses a flow rate control apparatus including a fluid resistor disposed in a flow channel, an upstream valve disposed upstream of the fluid resistor, and a downstream valve disposed downstream of the fluid resistor. The flow rate control method includes a resistor flow rate calculation step of calculating a resistor flow rate being a flow rate of a fluid flowing through the fluid resistor, and a control step of controlling the upstream valve or the downstream valve on the basis of a deviation between a set flow rate and the resistor flow rate, or a flow rate deviation being a deviation between the set flow rate and a flow rate calculable from the resistor flow rate. The control step includes controlling the downstream valve on the basis of the flow rate deviation when a valve opening of the downstream valve is smaller than a predetermined valve opening. The control step includes controlling the upstream valve on the basis of the flow rate deviation when the valve opening of the downstream valve is the predetermined valve opening or more. With the flow rate control method, high-speed responsiveness can be implemented during the transient response, and the pressure loss due to the downstream valve can be minimized as much as possible after reaching the steady state.

In order to obtain the same effect as the flow rate control apparatus in the present invention, for example, by updating a program in an existing flow rate control apparatus, it is necessary to use a flow rate control program used for a flow rate control apparatus including a fluid resistor disposed in a flow channel, an upstream valve disposed upstream of the fluid resistor, and a downstream valve disposed downstream of the fluid resistor. The flow rate control program causes a computer to implement functions as a resistor flow rate calculation section and a controller. The resistor flow rate calculation section calculates a resistor flow rate being a flow rate of a fluid flowing through the fluid resistor. The controller controls the upstream valve or the downstream valve on the basis of a deviation between a set flow rate and the resistor flow rate, or a flow rate deviation being a deviation between the set flow rate and a flow rate calculable from the resistor flow rate. The controller is designed to control the downstream valve on the basis of the flow rate deviation when a valve opening of the downstream valve is smaller than a predetermined valve opening. The controller is designed to control the upstream valve on the basis of the flow rate deviation when the valve opening of the downstream valve is the predetermined valve opening or more.

Alternatively, the flow rate control program may be electronically distributed, or may be stored in a recording medium, such as CD, DVD, HDD, and flash memory.

Effect of the Invention

With the flow rate control apparatus in the present invention, high-speed flow rate control can be implemented in a state in which a control point for flow rate is brought near a fluid supply object as much as possible during the time that the valve opening of the downstream valve is smaller than a predetermined valve opening. By changeover to the flow rate control by the upstream valve after the valve opening of the downstream valve reaches the predetermined valve opening or more, robust control less likely to be affected by disturbance or the like can be implemented by keeping the control point for flow rate away from the supply object in a stable state of flow rate. Additionally, because the downstream valve can be held opened, the pressure loss is reducible even though including a plurality of valves.

DESCRIPTION OF THE EMBODIMENTS

Description of Configuration

A flow rate control apparatus 100 in a first embodiment of the present invention is described below with reference to the accompanying drawings.

The flow rate control apparatus 100 in the first embodiment is intended to be used for supplying gas that is a fluid into a chamber at a set flow rate in, for example, a semiconductor manufacturing process. The set flow rate is a step signal that causes stepwise rising or falling from a certain flow rate value to another flow rate value. A configuration is established so that a flow rate implemented by the flow rate control apparatus 100 follows the set flow rate within a predetermined period of time.

Figure 1:
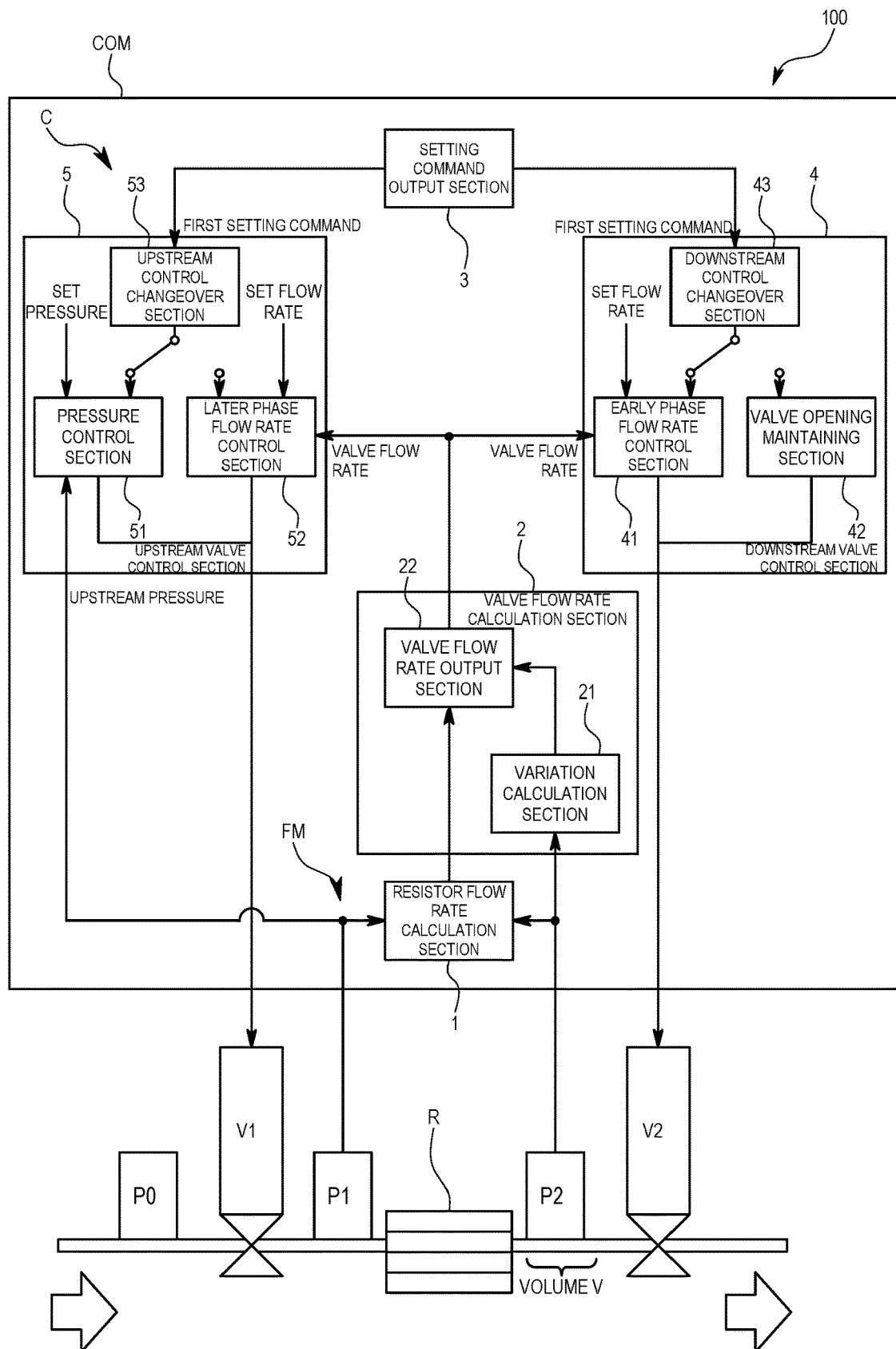
FIG. 1 is a schematic diagram illustrating a transient response state of a flow rate control apparatus in a first embodiment of the present invention.
Figure 2:
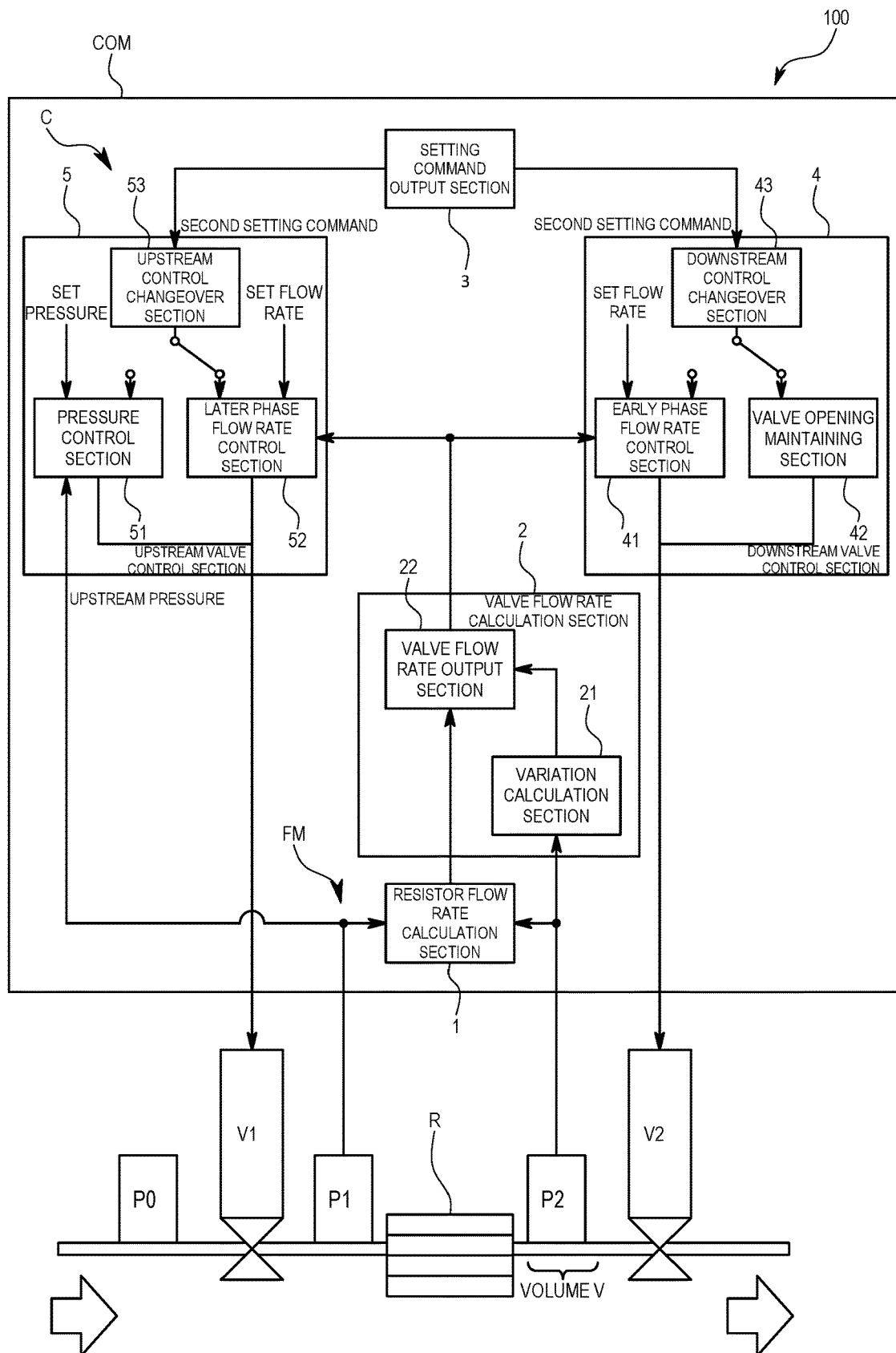
FIG. 2 is a schematic diagram illustrating a steady response state of the flow rate control apparatus in the first embodiment.

Specifically, the flow rate control apparatus 100 includes a fluid apparatus composed of a sensor and a valve disposed on a flow channel, and a control mechanism COM that handles control of the fluid apparatus as illustrated in FIGS. 1 and 2.

A supply pressure sensor P0, an upstream valve V1, an upstream pressure sensor P1, a fluid resistor R, a downstream pressure sensor P2, and a downstream valve V2 are sequentially disposed in this order from an upstream side relative to the flow channel. The fluid resistor R is, for example, a laminar flow device, which generates a differential pressure according to flow rates of the gas flowing ahead of and behind the laminar flow device.

The supply pressure sensor P0 is intended to monitor a pressure of gas supplied from upstream. The supply pressure sensor P0 may be omitted as long as a stable supply pressure is ensured.

The upstream pressure sensor P1 is designed to measure an upstream pressure that is a pressure of gas being charged in an upstream volume that is a volume between the upstream valve V1 and the fluid resistor R in the flow channel.

The downstream pressure sensor P2 is designed to measure a downstream pressure that is a pressure of gas being charged in a downstream volume V that is a volume between the fluid resistor R and the downstream valve V2 in the flow channel.

Thus, the upstream pressure sensor P1 and the downstream pressure sensor P2 are designed to respectively measure the pressures of the two volumes formed by the upstream valve V1, the fluid resistor R and the downstream valve V2. In other words, the upstream pressure sensor P1 and the downstream pressure sensor P2 are designed to respectively measure the pressures in the volumes located ahead of and behind the fluid resistor R.

The upstream valve V1 and the downstream valve V2 are of the same type, for example, piezo valves in the first embodiment whose valve body is driven relative to a valve seat by a piezo element. Valve openings of the upstream valve V1 and the downstream valve V2 are respectively changed according to a voltage inputted as a manipulating variable.

A control mechanism COM is described in detail below.

The control mechanism COM is a so-called computer including, for example, a CPU, memory, an A/D convertor, a D/A convertor and input/output means. The control mechanism COM implements functions as at least a resistance flow rate calculation section 1, a valve flow rate calculation section 2, and a controller C by individual apparatuses that cooperate with one another through execution of a flow rate control program stored in the memory.

The resistor flow rate calculation section 1 constitutes a so-called differential pressure flow rate sensor FM together with the upstream pressure sensor P1, the fluid resistor R, and the downstream pressure sensor P2. Specifically, the resistor flow rate calculation section 1 is designed to calculate and output a resistor flow rate that is a flow rate of gas flowing through the fluid resistor R by taking, as input, an upstream pressure measured by the upstream pressure sensor P1 and a downstream pressure measured by the downstream pressure sensor P2. An existing calculation formula is applicable to a calculation formula for a flow rate used in the resistor flow rate calculation section 1. A resistor flow rate calculated by the resistor flow rate calculation section 1 is one which changes continuously and is delayed by a predetermined period of time relative to an actual flow rate of a fluid passing through the downstream valve V2 implemented by control of the downstream valve V2.

The valve flow rate calculation section 2 calculates and outputs a valve flow rate that is a flow rate of gas flowing from the downstream valve V2 on the basis of a resistor flow rate calculated by the resistor flow rate calculation section 1 and a downstream pressure measured by the downstream pressure sensor P2. More specifically, the valve flow rate calculation section 2 calculates a valve flow rate on the basis of the fact that constant times of a difference between a resistor flow rate that is a flow rate of gas flowing into a downstream volume between the fluid resistor R and the downstream valve V2, and a valve flow rate that is a flow rate of gas flowing from the downstream volume V is equal to temporal variation of the downstream pressure.

In other words, the valve flow rate calculation section 2 includes a variation calculation section 21 that calculates temporal variation of a downstream pressure measured by the downstream pressure sensor P2, and a valve flow rate output section 22 that calculates a valve flow rate on the basis of a resistor flow rate and the temporal variation of the downstream pressure.

The following is a description of a point that the valve flow rate is calculable on the basis of the resistor flow rate and the temporal variation of the downstream pressure.

$P_2 = nRT/V$ is obtained from a gas state equation where $P_2$ is a downstream pressure, V is a volume of a downstream volume, T is a temperature of gas, R is a gas constant, and n is a mass. The following equation is obtained by taking a time derivative of the above equation.

$$\frac{dn}{dt} = a(Q_1 - Q_2) \quad \text{[Equation 1]}$$

A time derivative of mass is in a proportional relationship with a flow rate of gas flowing into and out of the downstream volume V per unit time. Therefore, when $Q_1$ is a resistor flow rate, $Q_2$ is a valve flow rate and "a" is a constant, the following equation is obtained.

$$\frac{dP_2}{dt} = \frac{RT}{V}\frac{dn}{dt} \quad \text{[Equation 2]}$$

By solving each equation for the valve flow rate $Q_2$, the following equation is obtained.

$$Q_2 = Q_1 - A\frac{dP_2}{dt} \quad \text{[Equation 3]}$$

In the above equation, A is a function that collectively represents R, T, V and "a", and a value obtained by multiplying temporal variation of the downstream pressure by the function A is an inflow-outflow flow rate relative to a downstream volume. This equation shows that the valve flow rate is calculable on the basis of a resistor flow rate that is an actual measured value and a time derivative that is temporal variation of the downstream pressure.

The variation calculation section 21 is designed to calculate a time derivative as temporal variation of the downstream pressure measured by the downstream pressure sensor P2 in the first embodiment. The time derivative can be calculated by removing a difference from time series data of the downstream pressure.

The valve flow rate output section 22 calculates a valve flow rate from a constant A, which is previously obtained, for example, by an experiment, a resistor flow rate to be inputted, and the time derivative of the downstream pressure to be inputted from the variation calculation section 21. The valve flow rate output section 22 then outputs the valve flow rate to the controller C composed of the downstream valve control section 4, the upstream valve control section 5 and a setting command output section 3.

The controller C carries out flow rate control on the basis of the valve flow rate of either one of the upstream valve V1 and the downstream valve V2. In other words, the controller C carries out flow rate control by the downstream valve V2 with respect to, for example, a portion where a target value rises in terms of set flow rate. The controller C carries out the flow rate control by the upstream valve V1 after an actual flow rate approximately follows a portion where the target value is held constant in terms of set flow rate. Specifically, the controller C causes the valve opening of the downstream valve V2 to be increased by flow rate control and, from a point in time that the downstream valve V2 reaches a maximum valve opening, causes the downstream valve V2 to be held at the maximum valve opening and then changes over to the flow rate control by the upstream valve V1.

In order to implement the above control mode, the controller C includes the setting command output section 3, the downstream valve control section 4 and the upstream valve control section 5.

The setting command output section 3 outputs a first setting command to the upstream valve control section 5 and the downstream valve control section 4 when the valve opening of the downstream valve V2 is smaller than a valve opening for full opening that is a predetermined valve opening. The setting command output section 3 outputs a second setting command to the upstream valve control section 5 and the downstream valve control section 4 when the valve opening of the downstream valve V2 is the valve opening for the full opening. The downstream valve control section 4 and the upstream valve control section 5 are designed to change a control mode according to the first setting command or the second setting command being input thereto. The setting command output section 3 is designed to monitor, for example, a voltage applied to the downstream valve V2 and outputs the first setting command when a value of the voltage is smaller than a value of a voltage applied during the full opening. The setting command output section 3 is designed to output the second setting command when being the voltage applied during the full opening.

When the valve opening of the downstream valve V2 is smaller than the full opening that is the predetermined valve opening, the downstream valve control section 4 controls the valve opening of the downstream valve V2 on the basis of a flow rate deviation that is a deviation between a set flow rate preset by a user and a valve flow rate calculated by the valve flow rate calculation section 2. When the valve opening of the downstream valve V2 reaches the full opening, the downstream valve control section 4 continues to maintain the downstream valve V2 at the valve opening for full opening.

Specifically, the downstream valve control section 4 includes an early phase flow rate control section 41 designed to carry out flow rate feedback control of the downstream valve V2, a valve opening maintaining section 42 designed to maintain the valve opening of the downstream valve V2 at the full opening, and a downstream control changeover section 43 designed to cause only one of the early phase flow rate control section 41 and the valve opening maintaining section 42 to control the downstream valve V2 according to the first setting command or the second setting command to be inputted.

The early phase flow rate control section 41 carries out the flow rate feedback control of the downstream valve V2 at least in a transient state corresponding to, for example, a portion where a flow rate rises. The early phase flow rate control section 41 performs calculation using PID operation by means of a deviation between a set flow rate and a valve flow rate. The early phase flow rate control section 41 outputs a voltage corresponding to a calculated manipulated variable to the downstream valve V2. That is, an applied voltage that is a manipulated variable is suitably changed by the flow rate feedback control using a deviation between the set flow rate and the valve flow rate in the present embodiment. Because the valve flow rate is a value obtained by calculating a flow rate of a fluid flowing from the downstream valve V2 during the time that the downstream valve V2 is controlled by the early phase flow rate control section 41, a measured point of a flow rate approximately coincides with a control point for the flow rate. Consequently, little or no time delay exists between the valve flow rate and an actual flow rate, and it is therefore possible to enhance responsiveness when a flow rate rises. The early phase flow rate control section 41 is designed to carry out the flow rate feedback control prior to a late phase flow rate control section 52 described later. The term "early phase flow rate control" denotes flow rate control in the transient response state and in a part of a subsequent steady state when a step-shaped set flow rate is being inputted. The term "late phase flow rate control" denotes flow rate control subsequent to the early phase flow rate control.

The valve opening maintaining section 42 is designed to control a valve opening of the downstream valve V2 when the downstream valve V2 is not being controlled by the early phase flow rate control section 41. Specifically, the valve opening maintaining section 42 is designed to maintain the valve opening of the downstream valve V2 at a predetermined maintaining valve opening irrespective of a valve flow rate to be calculated. The valve opening maintaining section 42 continues to output a manipulated variable by which the downstream valve V2 reaches a maximum valve opening that is the maintaining valve opening in the first embodiment.

The downstream control changeover section 43 causes the early phase flow rate control section 41 to carry out the flow rate feedback control of the downstream valve V2 as illustrated in FIG. 1 when the first setting command is being inputted. The downstream control changeover section 43 causes the valve opening maintaining section 42 to change over the downstream valve V2 so as to be maintained at the maximum valve opening as illustrated in FIG. 2 when the second setting command is being inputted.

When the valve opening of the downstream valve V2 is smaller than the full opening that is the predetermined valve opening, the upstream valve control section 5 controls the upstream valve V1 on the basis of a pressure deviation that is a deviation between a set pressure preset by a user or the like and an upstream pressure measured by the upstream pressure sensor P1. When the valve opening of the downstream valve V2 reaches the full opening, the upstream valve control section 5 controls the upstream valve V1 on the basis of a deviation between the set flow rate and a valve flow rate.

Specifically, the upstream valve control section 5 includes a pressure control section 51 designed to carry out pressure feedback control of the upstream valve V1, a late phase flow rate control section 52 designed to carry out the flow rate feedback control of the upstream valve V1, and an upstream control changeover section 53 designed to change over control so that either one of the pressure control section 51 and the later phase flow rate control section 52 controls the upstream valve V1.

The pressure control section 51 carries out pressure feedback control of the upstream valve V1 so that a deviation between a set pressure and an upstream pressure becomes smaller in a transient state in which a target value rises in set flow rate. Also in the pressure feedback control, a manipulated variable is calculated by performing PID operation on the basis of, for example, a deviation between the set pressure and the upstream pressure, and a voltage according to the manipulated variable is outputted to the upstream valve V1.

In a steady state in which a stable target value is maintained in terms of set flow rate and a flow rate of a fluid passing through the downstream valve V2 approximately follows, the later phase flow rate control section 52 carries out flow rate feedback control of the upstream valve V1 on the basis of a deviation between a set flow rate and a valve flow rate. The later phase flow rate control section 52 also controls a voltage outputted to the upstream valve V1 by, for example, a control algorithm similar to that in the early phase flow rate control section 41.

The upstream control changeover section 53 changes over control so as to cause the pressure control section 51 to carry out control of the upstream valve V1 when the first setting command is being inputted as illustrated in FIG. 1, and so as to cause the later phase flow rate control section 52 to carry out control of the upstream valve V1 when the second setting command is being inputted as in FIG. 2.

Description of Operation

A flow rate control operation when a step-shaped setting flow rate is being inputted in the flow rate control apparatus 100 thus configured is described below with reference to the flowchart of FIG. 3 and the graph of FIG. 4.

Once a target value rises from, for example, zero to a predetermined value in terms of set flow rate (step S1), the downstream valve V2 is initially fully closed. Therefore, the setting command output section 3 outputs the first setting command to the upstream valve control section 5 and the downstream valve control section 4 (step S2).

The downstream control changeover section 43 changes over control so as to cause the early phase flow rate control section 41 to output a manipulated variable to the downstream valve V2 as illustrated in FIG. 1. In the meanwhile, the upstream control changeover section 53 changes over control so as to cause the pressure control section 51 to output a manipulated variable to the upstream valve V1 (step S3).

Consequently, the downstream valve control section 4 starts control of the downstream valve V2 by flow rate feedback control on the basis of a deviation between a set flow rate and a valve flow rate (step S4). The upstream valve control section 5 starts control of the upstream valve V1 by pressure feedback control on the basis of a deviation between a set pressure and an upstream pressure (step S5).

Figure 4:
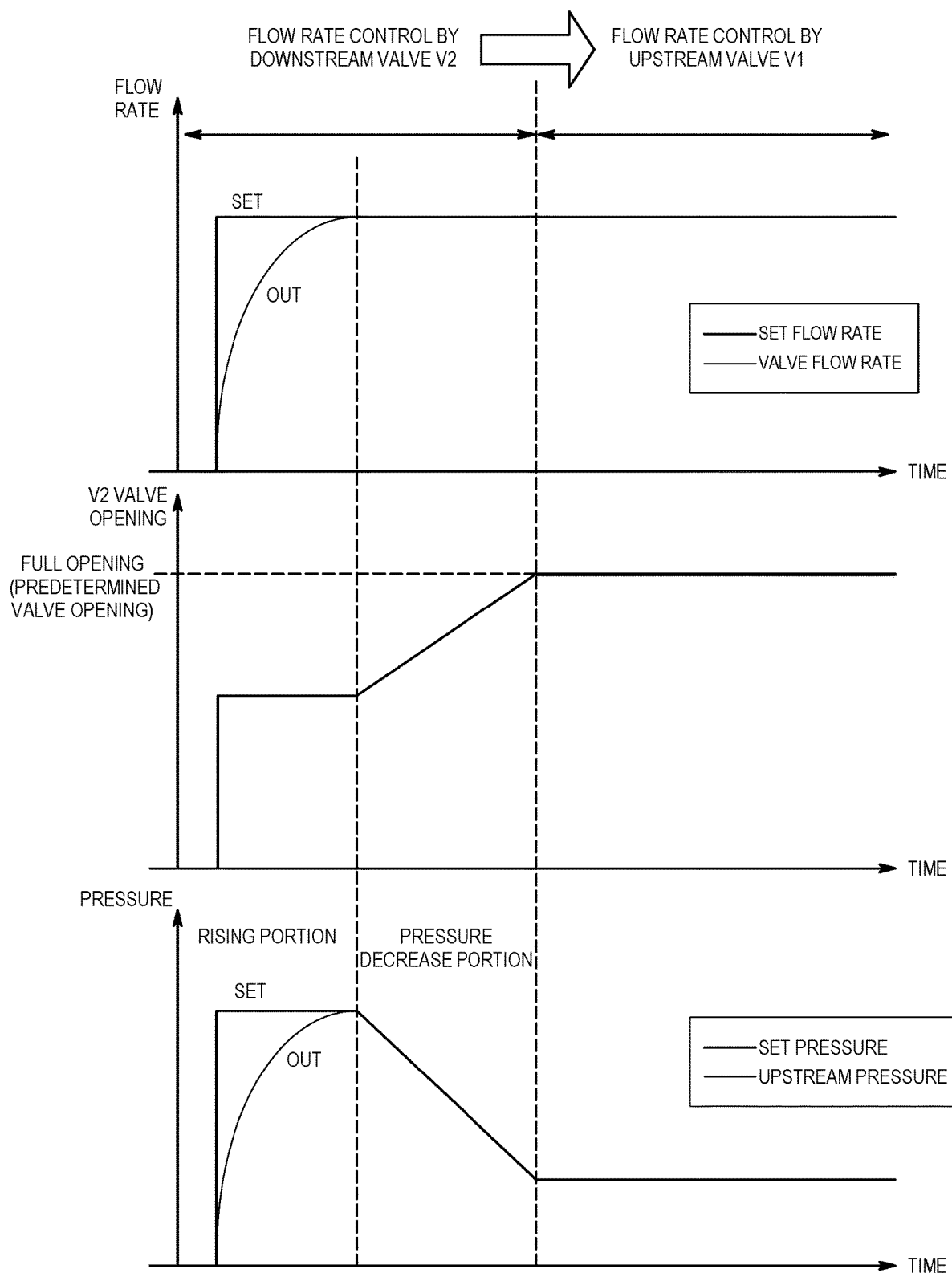
FIG. 4 is a schematic graph illustrating a control mode for the flow rate control apparatus in the first embodiment.

During a transient response before following up the target value as illustrated in the graph of FIG. 4, the downstream valve V2 is approximately maintained at an early phase valve opening according to the deviation between the set flow rate and the valve flow rate. A rising portion, to which a steady target value is set, is being set to set pressure in order to implement a pressure suitable for the valve flow rate to rise to the target value at high speed. The control of the upstream valve V1 is carried out so that the upstream pressure coincides with the steady target value of the set pressure.

From a point in time that the target value of the set flow rate approximately coincides with the valve flow rate, the downstream valve V2 is also opened to continuously maintain the target value of the set flow rate. Due to opening of the downstream valve V2, a pressure difference between the upstream valve V1 and the downstream valve V2 occurs, and the valve flow rate tends to decrease. The downstream valve V2 is controlled by the flow rate feedback so that the decrease of the valve flow rate can be immediately prevented, and the valve opening becomes greater. Because this operation is designed to be repeated per control cycle, the valve opening of the downstream valve V2 becomes greater, whereas upstream pressure and downstream pressure continue to decrease. A pressure decrease portion is set in the first embodiment so that the set pressure is decreased from a maximum value to a predetermined value from a point in time that the set flow rate coincides with the valve flow rate or from near the point in time, in accordance with the pressure decrease. That is, as illustrated in the graph of FIG. 4, the set pressure is designed to continuously decrease until reaching a pressure for a steady state by which it is possible to enhance sensitivity to a minute flow rate change in the steady state before flowrate control by the upstream valve V1 is started after the set flow rate coincides with the valve flow rate. A pressure suitable for implementing flow rate control having enhanced responsiveness in each of the rising timing and the steady state for flow rate can be implemented by the pressure control carried out as illustrated in FIG. 4. Additionally, due to the absence of a portion where a target pressure value changes discontinuously when decreasing pressure, it is possible to prevent a deviation of valve flow rate being maintained at the set flow rate.

Figure 3:
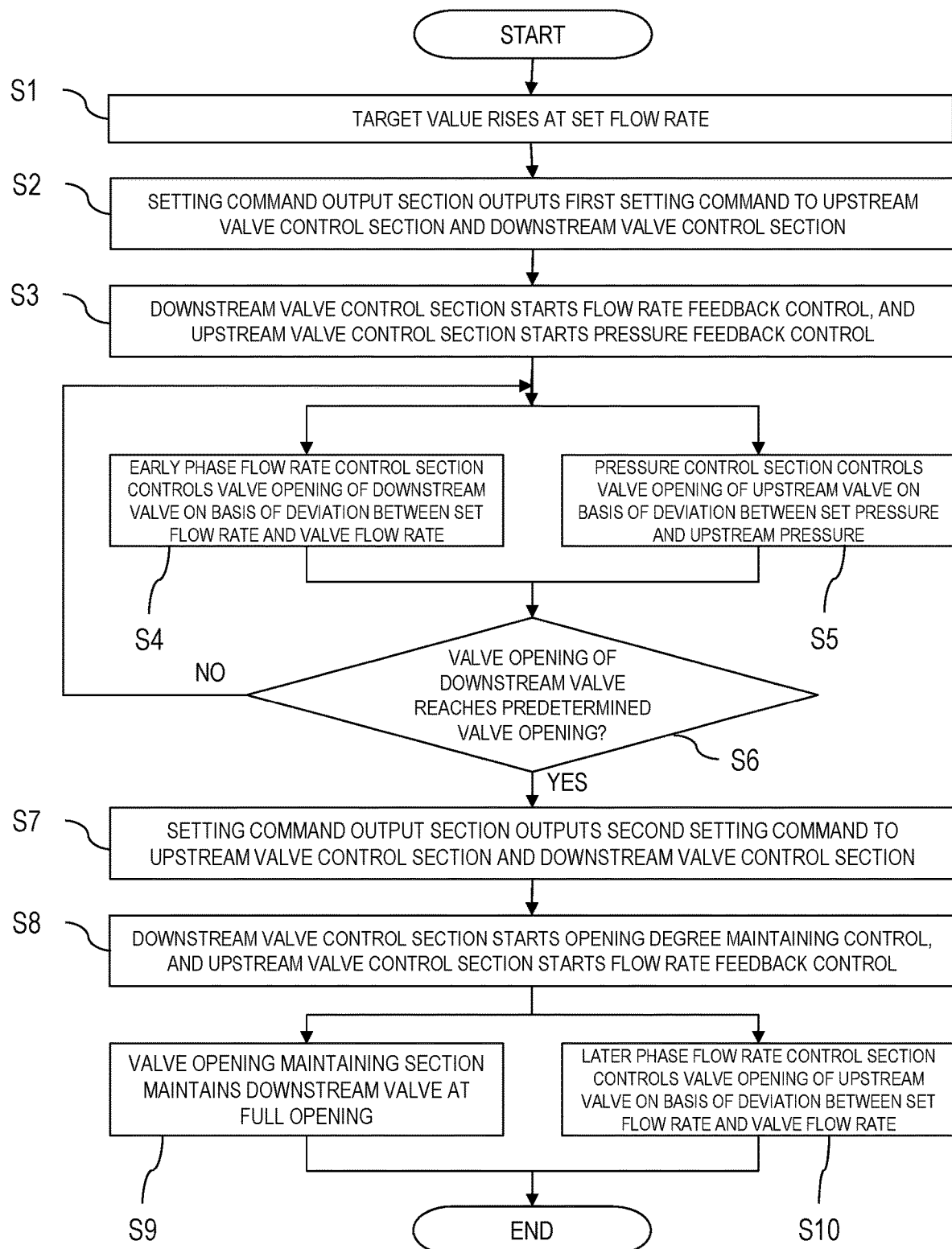
FIG. 3 is a flowchart illustrating a control operation of the flow rate control apparatus in the first embodiment.

As illustrated in the flowchart of FIG. 3, the setting command output section 3 makes a determination all the time as to whether the valve opening of the downstream valve V2 reaches the full opening on the basis of a voltage applied to the downstream valve V2 (step S6). When the valve opening of the downstream valve V2 is not the full opening, the control states in step S4 and S5 are maintained.

When the setting command output section 3 makes a determination that the valve opening of the downstream valve V2 reaches the full opening, the setting command output section 3 outputs the second setting command to the upstream valve control section 5 and the downstream valve control section 4 (step S7).

The downstream control changeover section 43 changes over control so that the opening maintaining section 42 outputs a manipulated variable to the downstream valve V2 as illustrated in FIG. 2. In the meanwhile, the upstream control changeover section 53 changes over control so that the later phase flow rate control section 52 outputs a manipulated variable to the upstream valve V1 (step S8).

Consequently, the downstream valve control section 4 continues to permit opening of the downstream valve V2 at the maximum valve opening (step S9). The upstream valve control section 5 starts control of the upstream valve V1 by flow rate feedback control on the basis of a deviation between the set flow rate and the valve flow rate (step S10). That is, after the downstream valve V2 reaches the maximum valve opening, the flow rate control is continued substantially only by the upstream valve V1 disposed upstream of the fluid resistor R.

Description of Effects

With the flow rate control apparatus 100 thus configured in the first embodiment, the flow rate control under which a control point coincides with a measuring point in the downstream valve V2 can be carried out at least during the transient response in which the set flow rate rises from, for example, zero to a predetermined value. In other words, delay in flow rate measurement can be decreased by a calculated valve flow rate, thereby considerably reducing time required for convergence of the transient response.

After the valve flow rate becomes stable at a constant value by the flow rate control of the downstream valve V2, it is possible to change over to the flow rate feedback control by the upstream valve V1 while the downstream valve V2 is maintained at the maximum valve opening at a point in time at which the downstream valve V2 reaches the full opening.

Therefore, in the steady state in which the valve flow rate is stable at the constant value, a state in which the downstream valve V2 does not substantially exist in the flow channel can be implemented to considerably reduce pressure loss due to the downstream valve V2. Additionally, because the downstream valve V2 is fully opened and only the upstream valve V1 is subjected to the flow rate feedback control in the steady state, pressure variation is less likely to occur in the space between the upstream valve V1 and the downstream valve V2, thus leading to stable and robust flow rate control as illustrated in the graph of FIG. 4.

Figure 5:
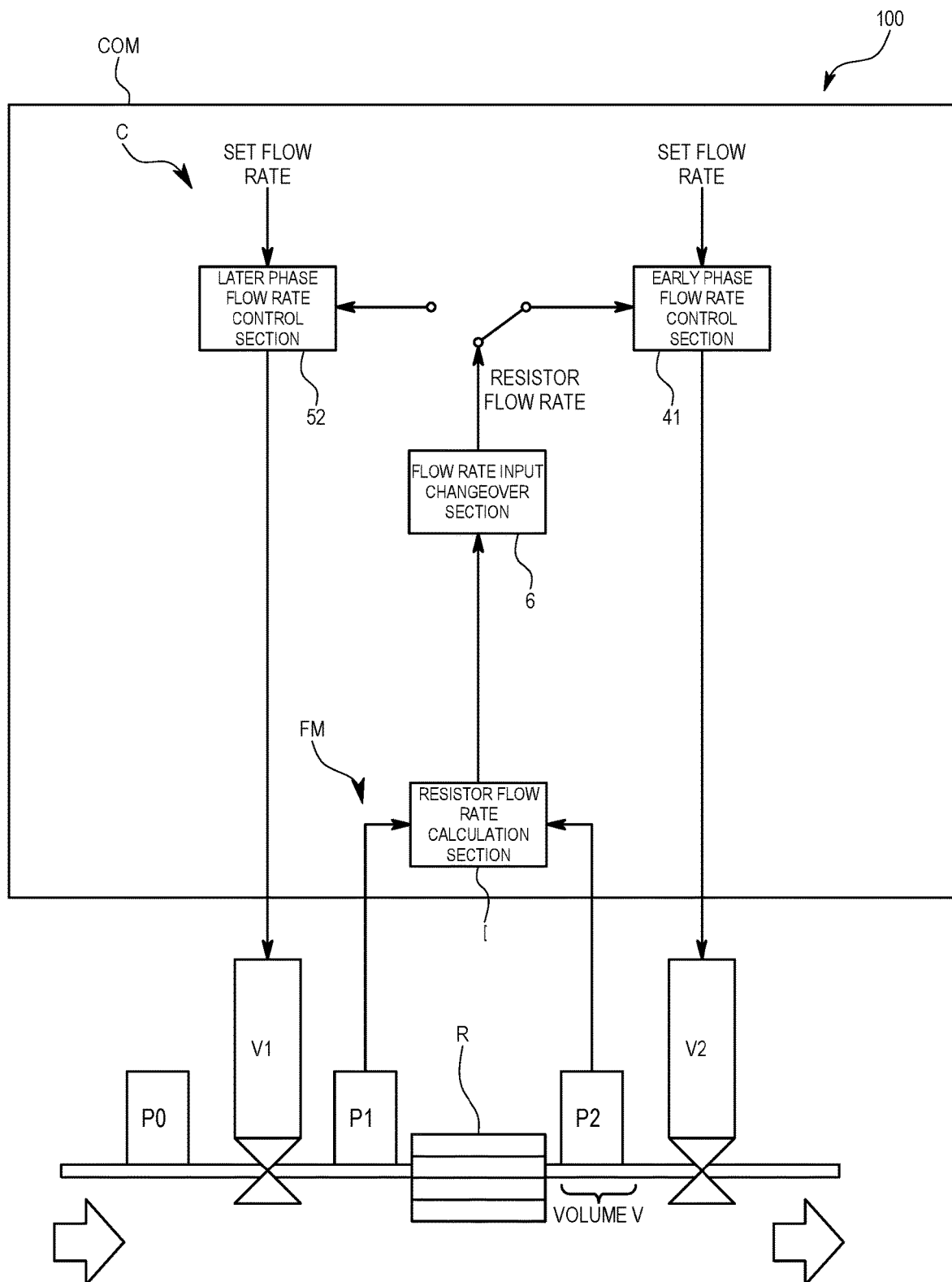
FIG. 5 is a schematic diagram illustrating a flow rate control apparatus in a second embodiment of the present invention.

A flow rate control apparatus 100 in a second embodiment of the present invention is described below with reference to FIG. 5. Members corresponding to the members described in the first embodiment are identified by the same reference numerals.

The flow rate control apparatus 100 in the second embodiment is designed so that the controller C controls the upstream valve V1 and the downstream valve V2 by using a deviation between a set flow rate and a resistor flow rate as a flow rate deviation. Specifically, when a valve opening of the downstream valve V2 is smaller than full opening that is a predetermined valve opening, the controller C inputs a resistor flow rate only to the early phase flow rate control section 41 so as to carry out flow rate feedback control by the downstream valve V2. When the downstream valve V2 reaches the full opening, the controller C inputs a resistor flow rate only to the later phase flow rate control section 52 so as to change over to flow rate feedback control by the upstream valve V1. The controller C includes a flow rate input changeover section 6 designed to change over flow rate feedback control by changing over an input destination to which the resistor flow rate is inputted, according to the valve opening of the downstream valve V2.

With the flow rate control apparatus 100 in the second embodiment, for example, when a step-shaped set flow rate is being set, it is possible to carry out flow rate feedback control by the downstream valve V2 close to a gas supply object, such as a chamber, during the early phase flow rate control including the transient response, and it is also possible to carry out changeover to the flow rate feedback control by the upstream valve V1 after the valve opening of the downstream valve V2 reaches the full opening. Therefore, time delay can be decreased by setting a flow rate control point near a supply object during the transient response, thereby enhancing control responsiveness. After the flow rate becomes stable as in the steady state, flow rate feedback control by the upstream valve V1 away from the supply object is carried out, thus leasing to robust control less susceptible to the influence of disturbance or the like. When the flow rate feedback control by the upstream valve V1 is being carried out, the valve opening does not vary due to flow rate in the downstream valve V2. If the downstream valve V2 is of normal open type, it can be maintained in an open state. Hence, during flow rate feedback control by the upstream valve V1, it is possible to establish a state in which the downstream valve V2 does not substantially exist, thereby considerably reducing pressure loss than a conventional flow rate control apparatus including a plurality valves.

Other embodiments are described below.

Changeover from the flow rate control by the downstream valve to the flow rate control by the upstream valve is not limited to a point in time that the downstream valve reaches the full opening. The controller may be designed to carry out the changeover from the flow rate control by the downstream valve to the flow rate control by the upstream valve when the downstream valve reaches a predetermined valve opening. For example, the predetermined valve opening is a valve opening that is smaller than the full opening by a predetermined value. The predetermined valve opening is preferably a valve opening by which pressure loss occurred in the downstream valve has an allowable value during the flow rate control by the upstream valve.

The configuration for determining whether the downstream valve reaches the predetermined valve opening is not limited to one which is designed to obtain a voltage applied to the downstream valve. For example, a determination may be made that the downstream valve reaches a predetermined valve opening on the basis of a value based on a manipulated variable calculated in the early phase flow rate control section, or on the basis of elapsed time from a point in time that a target value rises in set flow rate. Alternatively, a displacement sensor designed to detect a position of a valve body may be disposed in the downstream valve. A setting command output section may be designed to determine whether the downstream valve reaches the predetermined valve opening on the basis of output of the displacement sensor. In the present specification, the cases where the downstream valve reaches the predetermined valve opening denote only cases where the valve opening of the downstream valve actually reaches the predetermined valve opening but also cases where a measurement value and a calculated value related or convertible to valve opening have values corresponding to the predetermined valve opening.

Although the early phase flow rate control section and the later phase flow rate control section are configured to carry out the flow rate feedback control by the same control algorithm in the first embodiment, both sections may be different in control algorithm, control factor, and kind of flow rate to be fed back.

For example, the early phase flow rate control section may set a control factor so that convergence time and overshoot for transient response are optimized for requirements specification, and the later phase flow rate control section may set a control factor different from that in the early phase flow rate control section so as to become robust against disturbance or the like. Because each of a resistor flow rate and a valve flow rate is designed to approximately identical with an outputted value in the steady state, the later phase flow rate control section may be configured to feed back the resistor flow rate instead of the valve flow rate. In this case, measurement noise of the downstream pressure sensor is enlarged and not superimposed by the amount that the resistor flow rate does not include differential operation, and the influence of noise is less likely to occur in the flow rate feedback control. It is therefore possible to further stabilize the flow rate control by the later phase flow rate control section.

Although the upstream valve is subjected to pressure feedback control during the flow rate feedback control by the downstream valve in the first embodiment, control may be carried out so that the upstream valve maintains, for example, a predetermined valve opening without feeding back any upstream pressure.

Although the flow rate sensor in the first embodiment is the pressure type flow rate sensor composed of the upstream pressure sensor, the fluid resistor, the downstream pressure sensor and the resistor flow rate calculation section, a flow rate sensor using other measurement principle is also usable. For example, a capillary that bypasses upstream and downstream sides of the fluid resistor may be disposed to employ a thermal-type flow rate sensor designed to measure a flow rate on the basis of temperatures at the upstream and downstream of the capillary. Specifically, the thermal-type flow rate sensor needs to include a first coil designed to carry out output on the basis of a temperature at an upstream side of a fluid flowing through the capillary, and a second coil designed to carry out output on the basis of a temperature at a downstream side of the capillary, a flow rate detection circuit designed to generate output according to the flow rates from the output of the first coil and the output of the second coil, and a resistor flow rate calculation section. The resistor flow rate calculation section needs to be configured to calculate a resistor flow rate on the basis of output of the flow rate detection circuit.

Besides the above, part or all of various embodiments may be combined together or part of the embodiments may be modified without departing from the spirit and scope of the present invention.

DESCRIPTION OF REFERENCE CHARACTERS 100 flow rate control apparatus
V1 upstream valve
V2 downstream valve
P1 upstream pressure sensor
P2 downstream pressure sensor
R fluid resistor
V downstream volume
1 resistor flow rate calculation section
2 valve flow rate calculation section
21 variation calculation section
22 valve flow rate output section
3 setting command output section
4 downstream valve control section
41 early phase flow rate control section
42 valve opening maintaining section
43 downstream control changeover section
5 upstream valve control section
51 pressure control section
52 later phase flow rate control section
53 upstream control changeover section

What is claimed is:
1. A flow rate control apparatus comprising:
a fluid resistor disposed in a flow channel;
an upstream valve disposed upstream of the fluid resistor;
a downstream valve disposed downstream of the fluid resistor;

a resistor flow rate calculator configured to calculate a resistor flow rate which is a flow rate of a fluid flowing through the fluid resistor, and a controller configured to control each of the upstream valve and the downstream valve based on a flow rate deviation between a set flow rate and the resistor flow rate, or a flow rate deviation which is a deviation between the set flow rate and a flow rate calculated from the resistor flow rate, wherein the controller is configured to determine that a valve opening degree of the downstream valve is smaller than a predetermined valve opening degree or the valve opening degree of the downstream valve has reached the predetermined valve opening degree;

the controller is configured to, responsive to determining that the valve opening degree of the downstream valve is smaller than the predetermined valve opening degree, control a valve opening degree of the downstream valve based on the flow rate deviation to thereby carry out flow rate feedback control by the downstream valve, and the controller is configured, to change over the flow rate feedback control from the downstream valve to the upstream valve at least in part by, responsive to determining that the valve opening degree of the downstream valve has reached the predetermined valve opening degree, controlling a valve opening degree of the upstream valve based on the flow rate deviation to thereby carry out flow rate feedback control by the upstream valve.

2. The flow rate control apparatus according to claim 1, wherein the controller is configured to, responsive to determining that the valve opening degree of the downstream valve has reached the predetermined valve opening degree, control the valve opening degree of the upstream valve based on the flow rate deviation, and further control the downstream valve to hold the valve opening degree of the downstream valve constant at a maintaining valve opening degree that is identical with or different from the predetermined valve opening degree.

3. The flow rate control apparatus according to claim 1, further comprising:

an upstream pressure sensor disposed between the upstream valve and the fluid resistor, wherein the controller is configured to, responsive to determining that the valve opening degree of the downstream valve is smaller than the predetermined valve opening degree, control the valve opening degree of the downstream valve based on a flow rate deviation between the set flow rate and a valve flow rate, and further control the valve opening degree of the upstream valve based on a pressure deviation which is a deviation between a set pressure and an upstream pressure measured by the upstream pressure sensor.

4. The flow rate control apparatus according to claim 3, wherein the set pressure is held constant at a predetermined target pressure value, and then the set pressure is continuously decreased from the predetermined target pressure value.

5. The flow rate control apparatus according to claim 1, wherein the predetermined valve opening degree is a valve opening degree for full opening.

6. The flow rate control apparatus according to claim 1, wherein the controller further comprises:

a downstream valve control section configured to control the valve opening degree of the downstream valve;

an upstream valve control section configured to control the valve opening degree of the upstream valve; and a setting command output section configured to output a first setting command to the upstream valve control section and the downstream valve control section responsive to determining that the valve opening degree of the downstream valve is smaller than the predetermined valve opening degree, and configured to output a second setting command to the upstream valve control section and the downstream valve control section responsive to determining that the valve opening degree of the downstream valve has reached the predetermined valve opening degree.

7. The flow rate control apparatus according to claim 6, wherein the downstream valve control section comprises:

an early phase flow rate control section configured to output to the downstream valve a manipulated valuable calculated based on a flow rate deviation between the set flow rate and a valve flow rate;

a valve opening maintaining section configured to output a manipulated variable held constant to the downstream valve; and a downstream control changeover section configured to cause the early phase flow rate control section to output a manipulated variable when the first setting command is being input and cause the valve opening maintaining section to output a manipulated variable when the second setting command is being input.

8. The flow rate control apparatus according to claim 6, wherein the upstream valve control section comprises:

a pressure control section configured to output to the upstream valve a manipulated variable based on a pressure deviation;

a later phase flow rate control section configured to output to the upstream valve a manipulated variable based on the flow rate deviation; and an upstream control changeover section configured to cause the pressure control section to output a manipulated variable when the first setting command is being inputted and cause the later phase flow rate control section to output a manipulated variable when the second setting command is being inputted.

9. The flow rate control apparatus according to claim 1, further comprising:

a downstream pressure sensor disposed between the fluid resistor and the downstream valve; and a valve flow rate calculator configured to calculate a valve flow rate which is a flow rate of a fluid passing through the downstream valve based on the resistor flow rate and temporal variation of a downstream pressure measured by the downstream pressure sensor, wherein the flow rate deviation is a deviation between the set flow rate and the valve flow rate.

10. The flow rate control apparatus according to claim 9, wherein the resistor flow rate calculator is configured to calculate the resistor flow rate based on an upstream pressure measured by an upstream pressure sensor and the downstream pressure.

11. A flow rate control method using a flow rate control apparatus comprising a fluid resistor disposed in a flow channel, an upstream valve disposed upstream of the fluid resistor, and a downstream valve disposed downstream of the fluid resistor, the flow rate control method comprising:

a resistor flow rate calculation step of calculating a resistor flow rate which is a flow rate of a fluid passing through the fluid resistor;

a determining step of determining that a valve opening degree of the downstream valve is smaller than a predetermined valve opening degree or the valve opening degree of the downstream valve has reached the predetermined valve opening degree; and a control step of controlling each of the upstream valve and the downstream valve based on a deviation between a set flow rate and the resistor flow rate, or a flow rate deviation which is a deviation between the set flow rate and a flow rate calculated from the resistor flow rate, wherein the control step comprises controlling the valve opening degree of the downstream valve based on the flow rate deviation responsive to determining that the valve opening degree of the downstream valve is smaller than the predetermined valve opening degree to thereby carry out flow rate feedback control by the downstream valve, and the control step comprises changing over the flow rate feedback control from the downstream valve to the upstream valve at least in part by controlling a valve opening degree of the upstream valve based on the flow rate deviation responsive to determining that the valve opening degree of the downstream valve has reached the predetermined valve opening degree to thereby carry out flow rate feedback control by the upstream valve.

12. A program recording medium having recorded therein a flow rate control program used for a flow rate control apparatus comprising a fluid resistor disposed in a flow channel, an upstream valve disposed upstream of the fluid resistor, and a downstream valve disposed downstream of the fluid resistor, the flow rate control program causing a computer to implement functions as:

a resistor flow rate calculator configured to calculate a resistor flow rate which is a flow rate of a fluid passing through the fluid resistor; and a controller configured to determine that a valve opening degree of the downstream valve is smaller than a predetermined valve degree opening or the valve opening degree of the downstream valve has reached the predetermined valve opening degree, and control each of the upstream valve and the downstream valve based on a deviation between a set flow rate and the resistor flow rate, or a flow rate deviation which is a deviation between the set flow rate and a flow rate calculated from the resistor flow rate, wherein the controller is configured to control a valve opening degree of the downstream valve based on the flow rate deviation responsive to determining that the valve opening degree of the downstream valve is smaller than the predetermined valve opening degree to thereby carry out flow rate feedback control by the downstream valve, and the controller is configured change over the flow rate feedback control from the downstream valve to the upstream valve at least in part by controlling a valve opening degree of the upstream valve based on the flow rate deviation responsive to determining that the valve opening degree of the downstream valve has reached the predetermined valve opening degree to thereby carry out flow rate feedback control by the upstream valve.

* * * * *